(12) United States Patent
Nelson

(10) Patent No.: US 6,502,012 B1
(45) Date of Patent: Dec. 31, 2002

(54) NEWSPAPER RACK AUTOMATED INVENTORY MONITORING REQUEST APPARATUS AND METHOD

(76) Inventor: Kim Marie Nelson, 12784 Tulipwood Cir., Boca Raton, FL (US) 33428

( * ) Notice: Subject to any disclaimer, the term of this patent is extended or adjusted under 35 U.S.C. 154(b) by 0 days.

(21) Appl. No.: 10/086,577

(22) Filed: Feb. 28, 2002

Related U.S. Application Data

(63) Continuation-in-part of application No. 09/563,622, filed on May 2, 2000.
(60) Provisional application No. 60/133,656, filed on May 11, 1999.

(51) Int. Cl.[7] ............................................. G06F 17/00
(52) U.S. Cl. ........................ 700/236; 700/238; 700/241
(58) Field of Search .............................. 700/231, 235, 700/236, 238, 241

(56) References Cited

U.S. PATENT DOCUMENTS

| 5,091,713 | A |   | 2/1992  | Horne et al.       |
|-----------|---|---|---------|--------------------|
| 5,207,784 | A |   | 5/1993  | Schwartzendruber   |
| 5,415,264 | A | * | 5/1995  | Menoud ...... 700/236 |
| 5,450,938 | A |   | 9/1995  | Rademacher         |
| 5,845,577 | A |   | 12/1998 | Nelson et al.      |
| 5,947,328 | A |   | 9/1999  | Kovens et al.      |
| 6,038,491 | A |   | 3/2000  | McGarry et al.     |
| 6,152,365 | A |   | 11/2000 | Kolls              |
| 6,193,154 | B1 |  | 2/2001  | Phillips et al.    |
| 6,227,972 | B1 |  | 5/2001  | Walker et al.      |
| 6,230,150 | B1 |  | 5/2001  | Walker et al.      |
| 6,279,684 | B1 |  | 8/2001  | Lewis              |
| 6,295,482 | B1 |  | 9/2001  | Tognazzini         |

* cited by examiner

Primary Examiner—Christopher P. Ellis
Assistant Examiner—Gene O. Crawford
(74) Attorney, Agent, or Firm—Allen D. Hertz

(57) ABSTRACT

The present invention describes various methods and apparatus to increase efficiency and sales of a Newspaper Rack. Several sensors are positioned throughout the Newspaper Rack to monitor when the remaining inventory reaches a predetermined quantity or is depleted. A logic circuit monitors the sensors and when the sensors change state, a signal is transmitted to a central location. The central location may add time-stamping, reference the location, and compile the information into a database. The central location notifies the proper party to service the Newspaper Rack. The Newspaper Rack can include various mechanisms to stimulate customers into purchasing a Newspaper, such as a visual display or audible means. The stimulating information can be obtained and/or changed using wireless transmission to a receiver. The Newspaper Rack can include external monitoring devices to gather information for traffic flow, weather, or other desirable information. This can offset the service costs for monitoring the inventory levels. Power consumption and replenishment are considered by the inclusion of solar cells to recharge the battery, placement of the battery under the platform for ease of replacement, and the inclusion of a battery monitoring circuit for optimizing replacement.

21 Claims, 9 Drawing Sheets

NEWSPAPER RACK AUTOMATED INVENTORY MONITORING REQUEST APPARATUS AND METHOD

This patent application is a continuation-in-part of and claims priority to patent application Ser. No. 09/563,622 Filed May 2, 2000 which was claims priority to Provisional Patent Application No. 60/133,656 filed May 11, 1999, both of which are incorporated by reference herein.

FIELD OF THE INVENTION

This invention relates in general to a method and apparatus for an automated inventory monitoring system for a Newspaper Rack using wireless transmitters, the internet, and other automated notification means.

BACKGROUND OF THE INVENTION

The present invention is generally related to the use of remote automated apparatus for monitoring of inventory of Newspaper Racks. Newspaper racks are unique in that they are generally located where it would not be conducive to provide utilities such as power or telephone. Newspaper racks further utilize an honor system for purchases, whereby a consumer would insert change into a payment mechanism, the payment mechanism would allow the access door to open, and the consumer would honorably withdraw a single copy of the Newspaper.

Newspaper racks do not distribute change. They do not have sensors. They normally do not support portable power such as batteries.

Newspaper racks are desired to be manufactured of low cost materials and able to withstand harsh environments, including extreme variances in temperatures, extreme variances in humidity, salt spray (for corrosion), physical abuse, and the like.

The Newspaper companies print a predetermined quantity of Newspapers referred to as a draw. The draw is then distributed to the fleet of Newspaper Racks. The Single Copy Sales Manager uses very limited information to assist in the distribution process.

It is desirable for the Single Copy Sales Manager to obtain verification that each Newspaper Rack is filled and the time in which each Newspaper Rack is filled as well as when the inventory of each of the Newspaper Racks is depleted. This can aid in the distribution of the draw and further re-distribution of the draw upon depletion of the inventory. This will result in optimizing profits.

Newspaper Racks are normally located adjacent Newspaper Racks of competing companies. The optimal sales period for Newspapers is generally considered between 6 AM and 1 PM. Should the inventory of a Newspaper Rack become depleted prior to the end of the optimal time period, it would be desirable to replenish the inventory of the Newspaper Rack.

It would be desirable for a Single Copy Sales Manager to obtain demographics pertaining to the deployed number of Newspaper racks in order to predict an optimal distribution pattern.

Currently a consumer can enjoy the convenience of purchasing fuel without waiting to interact with an attendant through the implementation of automated payment systems at the fuel pumps, as taught by Wostl, et al (U.S. Pat. No. 3,786,421) and Gentile, et al (U.S. Pat. No. 3,931,497). Wostl, et al teaches the use of a credit card reader for the distribution of goods using an automated article dispensing system. Gentile, et al teaches similar to Wostl, with the focus on dispensing fuel. Both Wostl and Gentile teach the use of dispensing products from one of the specified dispensing machines.

The automated payment system receives the customer's payment information from any of several known methods such as reading a magnetic strip coupled to a plastic card, reading a coding from a Radio Frequency signal for a device such as a proximity card, direct interface to an integrated circuit card such as a smart card, or any other derived automated payment system recognized by one skilled in the art.

Upon authorization of the customer's provided automated payment system, the automated payment system allows the customer to dispense fuel into the customer's fuel storage device. Upon completion, the system records and communicates the transaction to the customer's payment institution. The automated payment system signals the customer for a receipt. Optionally, the automated payment system inquires the customer about including a car wash in the transaction. The automated transaction system provides a code to where the consumer enters the code into a keypad at the car wash to enable the car wash. Once a response to the inquiry is entered, or the automated transaction system completes a time out cycle, the automated transaction system completes the transaction.

Fuel stations have trended to include convenience marts at the same location, where the convenience marts provide sales of beverages, snacks, vehicle supplies (oils, fluids, etc.), newspapers, cigarettes, and even fast food retailers. Should the customer desire to purchase fuel and other items, the customer must complete two separate transactions and wait to interact with an attendant for servicing. Alternatively, the customer may purchase some convenience items through dispensing/vending machines, which require currency. The use of credit cards for a single dispensing machine purchase is normally cost prohibitive, as the cost of the purchase does not justify the incurred cost of the transaction. These reasons may deter the customer from making additional purchases. Alternatively, Vayda (U.S. Pat. No. 4,169,521) teaches a drive in, single stop shopping facility, using an attendant to service the vehicle and the customer.

Drive through systems are becoming an institution within several industries, including fast food, drugstores, and the like.

Selective call receivers, such as paging devices, wireless personal data assistants, and the like, are known to remotely control devices such as lawn sprinkling systems for golf courses.

Selective call receivers, such as paging devices, wireless personal data assistants, and the like, are known to have two way signal transmission capabilities.

Liquid Crystal Displays (LCD's) and video monitors are known technologies that are used as customer interface devices at fuel pumps.

Automated teller machines (ATM's) are known to have flexible, soft menus using each entry point for multiple functions.

Newspaper dispensers are preferred to be low cost, free standing, and located in remote locations. Additionally, the newspaper dispensers are generally placed at locations that are not conducive to wired facilities, such as power, communications, and the like.

Vending machines and more specifically newspaper sales required that the automated vending machine have inventory. Newspapers have a shelf life of 24 hours, thus increasing the need for inventory control. Excess inventory must be scrapped; shortages limit the potential sales.

Automated dispensing or vending machines are known. Signal transmissions or other means to interface between two electronic circuits are known.

What is desired is a method and apparatus to provide for the customer to acquire goods through an automated dispensing machine and using a remote financial transaction system.

SUMMARY OF THE INVENTION

The present invention addresses the deficiencies in the present state of optimizing Newspaper Sales, including monitoring inventory, providing capabilities to pay via credit card, debit card, and other via a remote payment system, providing visual and audible signals to influence consumers, and changing sales prices.

A first aspect to the present invention is the ability to monitor a Newspaper Rack and identify when the Newspaper rack is filled.

A second aspect to the present invention is the ability to monitor a Newspaper Rack and identify when the inventory of the Newspaper rack is depleted.

A third aspect of the present invention is the ability to transmit a signal from a Newspaper Rack to identify when the inventory of the Newspaper Rack is filled or depleted.

A forth aspect of the present invention is the ability to receive the transmitted signal, determine the location of the rack.

A fifth aspect of the present invention is the ability to identify the time in which the signal is transmitted or received.

A sixth aspect to the present invention is the ability to further transfer the information received via the internet to electronically transfer and record any desirable information.

A seventh aspect to the present invention is the ability to monitor a Newspaper rack for any unwarranted motion, such as vandalism. One such means would be a mercury switch.

An eighth aspect of the present invention is the ability to monitor external activities such as traffic, weather, and the like using sensors proximate the Newspaper Rack.

A ninth aspect of the present invention is the ability to transfer information to a Newspaper Rack to change the price of the Newspaper.

A tenth aspect of the present invention is the inclusion of an LED display and respective circuitry to visually attract consumers.

An eleventh aspect of the present invention is the inclusion of a speaker and respective circuitry to record and play an audible message to attract consumers.

A twelfth aspect of the present invention is the ability to transfer a message to a Newspaper Rack to attract consumers, whereby some examples would be to flash a specific headline across an LED display to visually attract consumers, a sound transmission to audibly transmit a signal to attract consumers, and the like.

A thirteenth aspect of the present invention is the inclusion of solar power panels for power sourcing and optionally recharging of batteries.

A fourteenth aspect of the present invention is the inclusion of a charging system that utilizes the process of opening and closing the access door on a Newspaper Rack to power the charging system.

A fifteenth aspect of the present invention is the inclusion of a means to identify when a newspaper is placed within a door of a Newspaper Rack.

A sixteenth aspect of the present invention is the inclusion of an electro-mechanical switch to identify when a newspaper is placed within the door of a Newspaper Rack.

A seventeenth aspect of the present invention is the inclusion of a means to identify when a newspaper is placed upon a platform of a Newspaper Rack.

An eighteenth aspect of the present invention is the inclusion of a electro-mechanical switch to identify when a newspaper is placed upon the platform of a Newspaper Rack.

A nineteenth aspect of the present invention is the inclusion of an adjustable platform, whereby the present invention includes a means to identify when the platform moves beyond a predetermined position within the Newspaper Rack.

A twentieth aspect of the present invention is a Newspaper Rack that includes a battery holder positioned on the underside of a platform.

A twenty-first aspect of the present invention is a Newspaper Rack that includes a battery holder whereby the battery contains two terminals located at one end and whereby when the battery is inserted into the battery holder, the two battery terminals make electrical connectivity with two respective receiving battery contacts.

A twenty-second aspect of the present invention is the inclusion of a means that a service person can cause the system to transmit a signal identifying a service completion.

A twenty-third aspect of the present invention is the use of a remote means to change the price of respective goods.

A twenty-forth aspect of the present invention is the ability to monitor the inventory of a Newspaper Rack whereby the Newspaper Rack is a shelf, rack, and the like positioned proximate a sales counter for retail sales. The shelf, rack, and the like does not automatically sell or use the honor system to sell newspapers.

A twenty-fifth aspect of the present invention is the ability to monitor the status of the battery.

BRIEF DESCRIPTION OF THE DRAWINGS

For the purpose of initially illustrating the invention, there is shown in the flow diagram, an embodiment that is presently preferred. It should be understood, however, that the present invention is not limited to the specific instrumentalities and methods disclosed. It can be recognized that the flow diagram represents a method and the associated apparatuses required to make the method in which persons skilled in the art may make various flow and interface diagrams from therein. In the drawing.

DETAILED DESCRIPTION OF THE DRAWINGS

Figure 1:
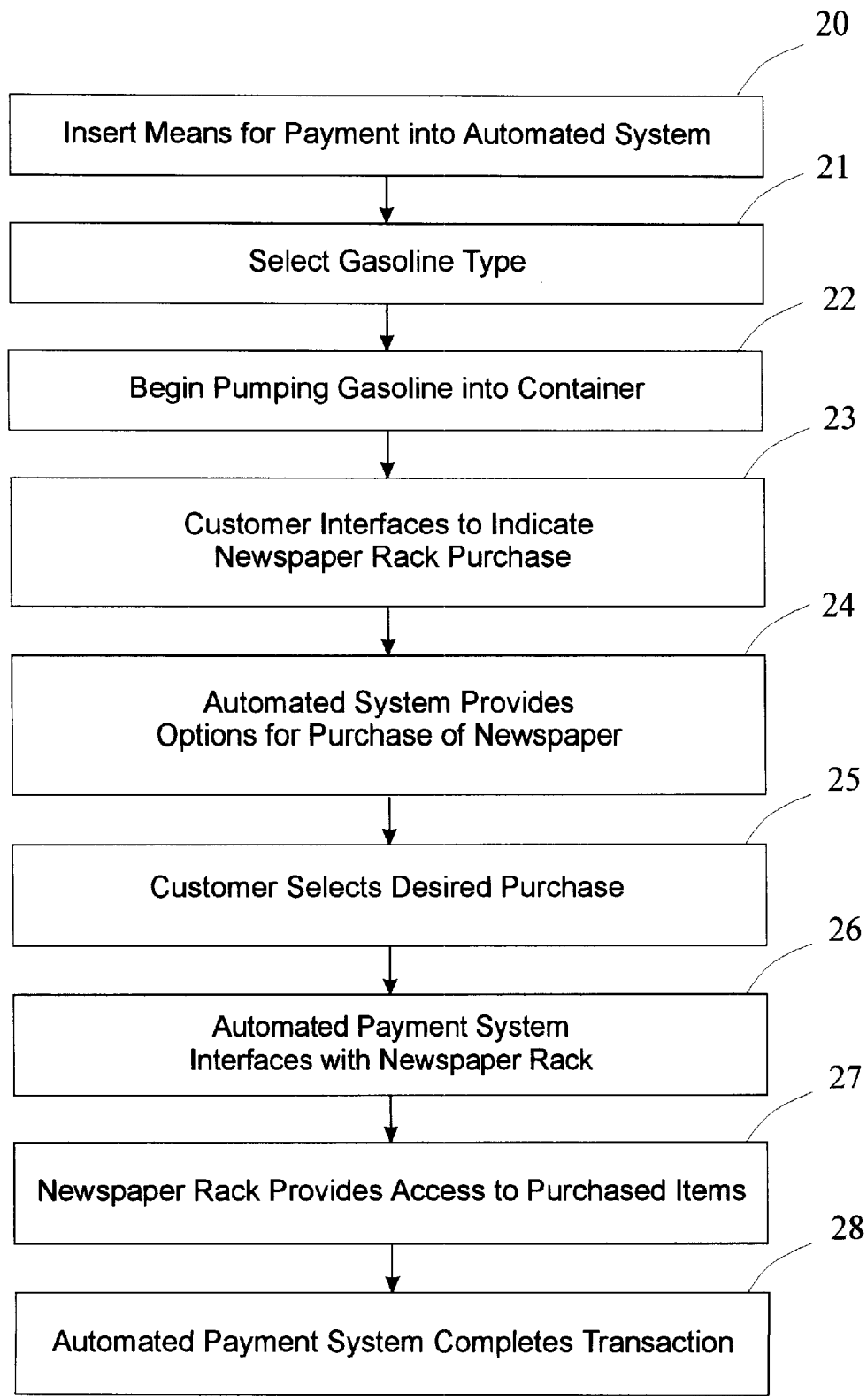
FIG. 1 is a flow chart diagram illustrating one potential process for achieving the desired invention. It should be understood that the order or process steps may deviate from the flow diagram provided, while maintaining the spirit and intent of the present invention.

FIG. 1 represents a flow diagram providing a general template for the present invention, where the spirit and intent of the present invention provides a means for a customer to make purchases from a Newspaper Rack using the same automated transactional purchase of fuel without the requirement to interact with an attendant. A first step 20 in the preferred embodiment would be to insert a means for payment such as depositing cash, credit card, debit card, smart card, or other into an automated payment system a means to approve payment. A second step 21 in the preferred embodiment would be where the customer would select the fuel type. A third step 22 in the preferred embodiment would be where the customer would begin dispensing fuel into the desired storage container, generally a vehicle fuel tank. The forth step 23 in the preferred embodiment would be where the customer has the ability to interface with the automated payment system to request a purchase from an Newspaper Rack. A fifth step 24 in the preferred embodiment would be where the automated payment system provides options for purchase from a Newspaper Rack. A sixth step 25 in the preferred embodiment would be where the customer selects the desired purchase from either the Newspaper Rack or automated payment system. A seventh step 26 in the preferred embodiment interfaces the automated payment system transmits a signal or electrical impulse to allow the door of the Newspaper Rack to open. An eighth step 27 in the preferred embodiment provides a method for the customer to acquire the desired purchases from the Newspaper Rack. A final step 28 in the preferred embodiment is the completion of the transaction, providing the tally of all purchases to the financial institution, reducing the tally on a smart card, or other known method for completing an automated transaction.

It can be recognized that one skilled in the art can provide a variety of processes that can accomplish the same result using many variations of the above teachings without diverging from the spirit and intent of the present invention.

Figure 2:
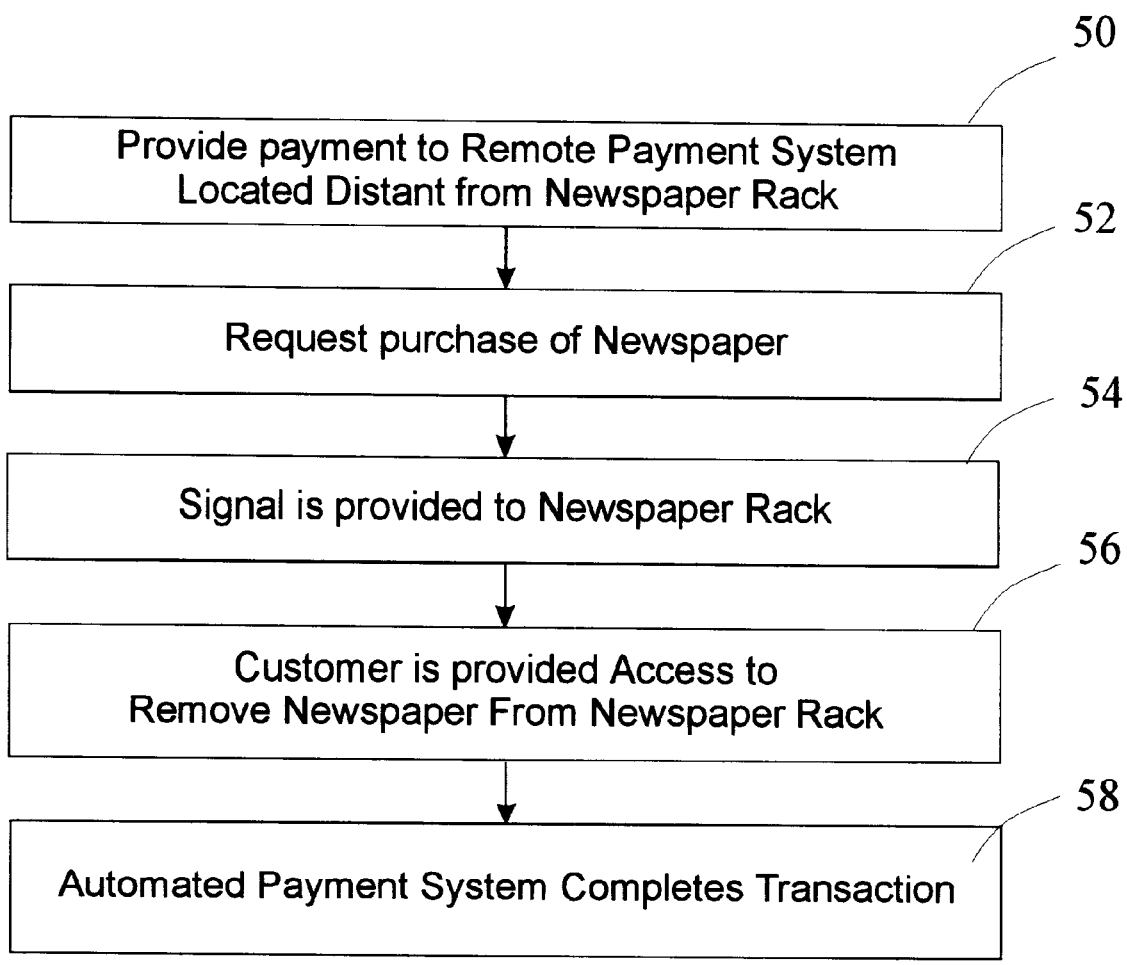
FIG. 2 is a flow diagram illustrating a second potential process for achieving the desired invention.

FIG. 2 illustrates a flow diagram depicting a second embodiment of the present invention. The customer would provide a payment or means for payment 50 to a remote automated payment system, where the remote automated payment system is one that is not located within or coupled to a Newspaper Rack. This may be by depositing cash, passing a credit card with a magnetic strip through a magnetic strip reader, inserting a smart card with an Integrated Circuit into a respective reader, passing an RF interface device across an RF reader, placing a users eye in front of an iris reader, placing a users finger onto a fingerprint reader, or any other known or developed method to determine the user and/or respective financial institution. The customer would follow the respective procedure to enable the remote automated payment system 50 to make the respective payment process. The customer would indicate that the customer desires to purchase a Newspaper from a Newspaper Rack 52. The customer can indicate the desire for purchase of a Newspaper from a Newspaper Rack by either asking an attendant at a drive through window, requesting desired purchase at the remote payment system, requesting the desired purchase at the Newspaper Rack, and the like. Once the remote payment system receives a signal that the customer desires to purchase a Newspaper and the remote payment system verifies the payment means, the remote payment system would then provide a signal to allow the customer to access the Newspaper from the Newspaper Rack 54. The signal would be transmitted to the Newspaper Rack to allow the customer to access the Newspaper from the Newspaper Rack 56. The Newspapers are distributed on an honor system, whereby the customer is honored to take one and only one newspaper. The customer may purchase other items including but not limited to cash, fuel, and and other items which are dispensed by other machines. The preferred embodiment would be a credit or debit card remote automated payment system placed within a gasoline dispenser. An first alternate embodiment would be the use of an Automated Teller Machine (ATM) that dispenses cash. A second alternate would be a cashier at a drive through window, such as for fast food. The remote payment system would complete the transaction 58.

Figure 3:
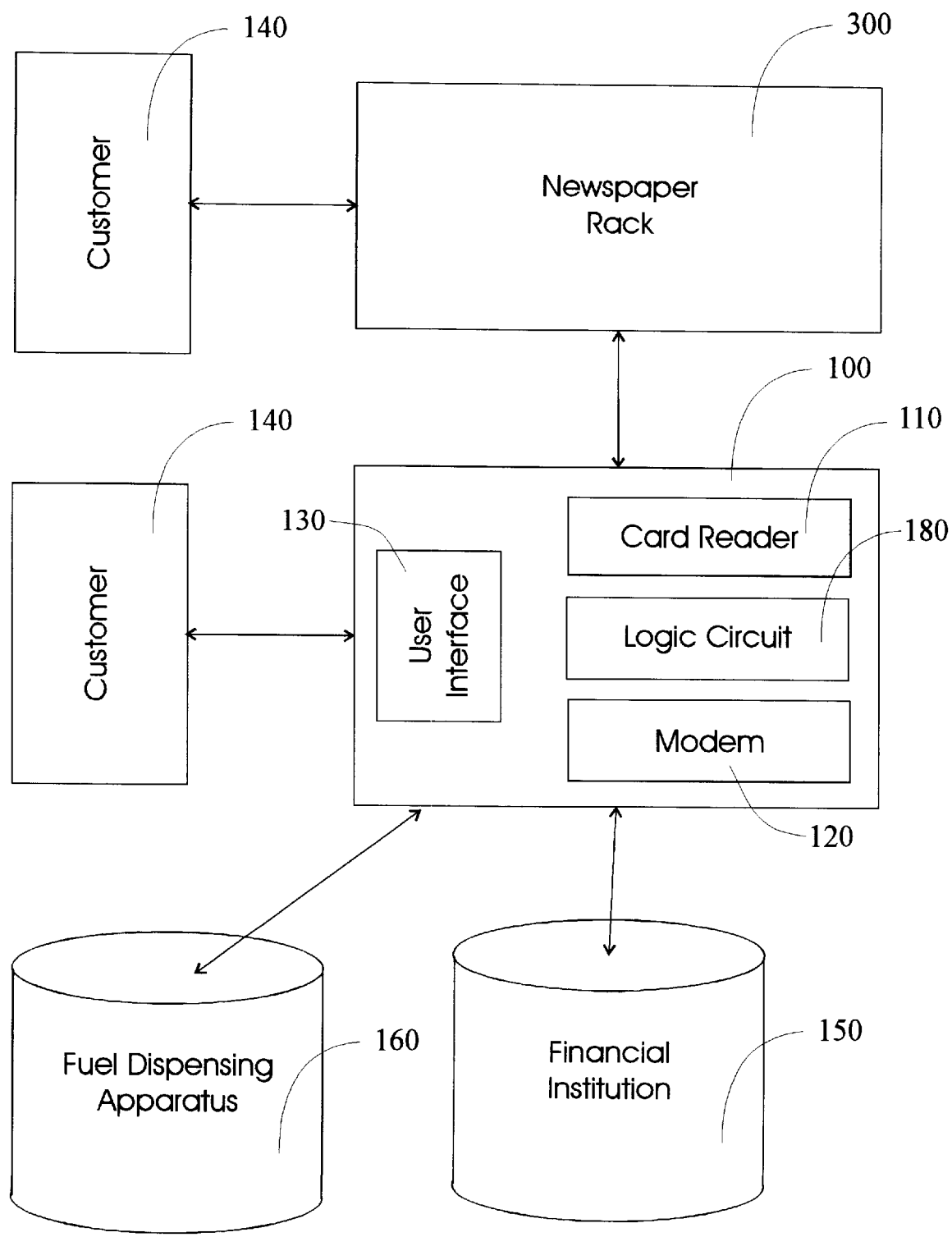
FIG. 3 is a conceptual schematic illustrating the preferred embodiment of the present invention.

FIG. 3 illustrates the a architectural diagram which includes an automated payment system 100, which includes a customer payment identification device 110, such as a credit card reader, a cash reader, an RF reader, a fingerprint reader, an iris recognition system, and the like, a remote interface device 120, such as a landline modem or a wireless modem, a logic circuit 180, and a user interface device 130 such as an LCD or video monitor and associated user entry features such as push buttons or touch screen display. All of the above components are currently known and available in various forms. It should be recognized that as processes for automated payment methods advance, these advanced methods and the associated changes would be included within the spirit and intent of the present invention. One such example would be smart cards that maintain a value balance within the card memory and do not require a modem or other method for contacting a financial institution database 150. Other methods of customer payment identification means may also be developed such as finger-print or iris recognition should also be considered and should be included within the spirit and intent of the present invention. The automated payment system may include a keypad and a request for a code from the customer to ensure security. The automated payment system 100 recognizes the associated payment method provided by the customer 140. The automated payment system 100 validates the payment method currently by using a remote interface device 120 such as a modem over communication lines to contact a financial institution's database 150, where the financial institution's database would complete a verification check and provide authorization to the automated payment system 100. Once the payment method is authorized, the automated payment system 100 transmits a signal to a fuel dispensing apparatus 160 allowing the customer 140 to transfer fuel from the fuel storage tank (not shown) to a desired customer storage tank (not shown) such as a gasoline tank of a vehicle. The user interface 130 includes a method for the customer 140 to request additional purchases such as from a Newspaper Rack 300 located proximate the automated payment system 100. Should the customer 140 request an additional transaction besides fuel, the automated payment system 100 would interface with the desired Newspaper Rack 300. The present invention may apply many variations of implementation and all should be considered within the spirit and intent of the present invention. The automated payment system 100 may utilize a user interface 130 such as a flexible, soft menu (see FIG. 4) to provide multiple interface methods with a limited number of entry devices. The customer would communicate with the system that the customer desires to additionally purchase a Newspaper using the user interface 130. The automated payment system would communicate with the Newspaper Rack 300 and allow the customer 140 to acquire a Newspaper (see FIG. 4). The electronic circuitry and metering system (not shown) within the fuel dispensing apparatus 160 would provide a total purchase (gallons, value, or both) to the automated payment system 100. Upon completion of all purchases, a logic circuit 180 would tally the total sale and complete the automated payment process. In the case that requires interfacing with a financial institution 150, the automated payment system 100 would interface with the financial institution 150 using the remote interface device 120 and transmit the tallied sale. It should be understood that the architectural diagram illustrates one method to achieve the desired results of one automated payment system 100 when interfacing an automated payment system 100 which primary function is to control a fuel dispenser to at least one Newspaper Rack 300 for one financial transaction. There are many other methods achieve the same results within the spirit and intent of the present invention.

Figure 4:
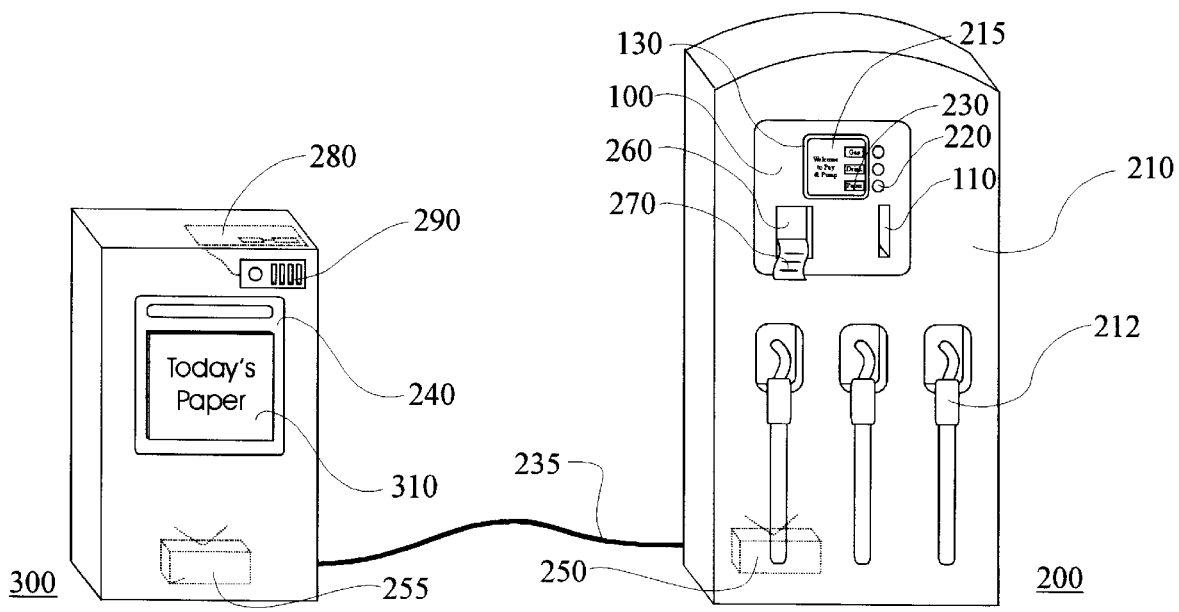
FIG. 4 is an isometric view of a Newspaper Rack integrated for payment with a fuel dispenser.

FIG. 4 illustrates an isometric view of one proposed implementation of the present invention, including a completely automated multiple purchase fuel station 200. The automated multiple purchase fuel station 200 includes an automated payment and fuel dispensing system 210. At least one of the multiple fuel dispensers 212 would be allowed to operate upon authorization of the payment method from the automated payment system 100. It can be recognized that the automated payment system 100 may be mounted in conjunction with or external to the automated fuel dispensing system 210 and control one or multiple fuel dispensers 212. The automated payment system 100 may be of various forms and functions without deviated from the spirit or intent of the present invention. The illustrated automated payment system 100 includes a customer payment identification device 110, illustrated as a card reader, a remote interface device 120 (not shown in FIG. 4) and a user interface device 130 illustrated as a flexible, soft menu LCD 215 and respective entry points 220, such as push buttons or touch pads. The flexible, soft menu LCD 215 includes software provided through a logic circuit 180 (not shown in FIG. 4) to change the functions of each entry point 220 and identifying the function of each entry point 220 by changing the user interface icons 230 displayed on the flexible, soft menu LCD 215. The customer (140 of FIG. 3) would enter a request for additional purchases by selecting the respective entry point 220. The automated payment system 100 would display additional information to direct the customer (140 of FIG. 3) through the process to make the desired purchase(s). The automated payment system 100 would transmit a signal via wires 235 or via remote payment transceiver 250 and Newspaper Rack transceiver 255 to a Newspaper Rack 300. The Newspaper Rack 300 can include Newspaper Rack Payment circuitry 280 that controls an release mechanism (not shown in detail in this figure) which would release the sales access door 240 and allow the customer 140 to acquire a newspaper 310 upon receipt of a transmitted signal from the automated payment system 100. The transmitted signal may be a voltage that causes a solenoid to reposition a pin, thus allowing the customer to open the access door and acquire the desired Newspaper 310. Optionally, the sales access door 240 can utilize the Newspaper Rack logic circuitry 280 to communicate with the automated payment system 100 to provide a method for confirmation of receipt of the Newspaper 310, commonly referred to as a closed loop system. It can be recognized that the remote payment transceiver 250 and the Newspaper Rack transceiver 255 may be designed to function as both receiver and transmitter, providing two-way communications, or the devices may include two such apparatus to provide the same results within the scope of the present invention. The automated payment system 100 completes the transaction by tallying the purchases (fuel, Newspaper, and other goods), communicates with the financial institution data-base (150 of FIG. 3) to transact the tally, then optionally prints and dispenses a receipt 270 using a receipt printer 260 for the customer (140 of FIG. 3).

Figure 5:
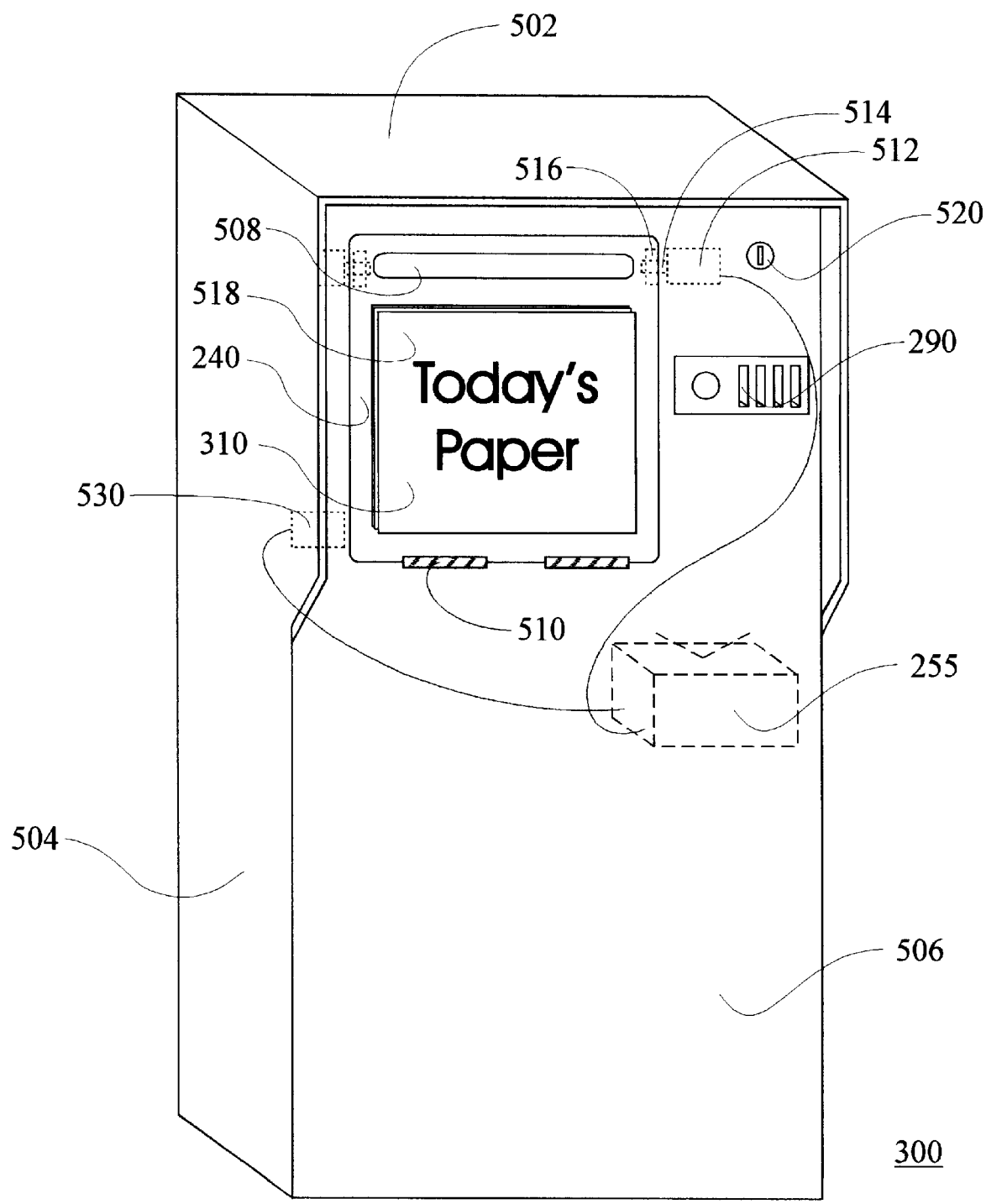
FIG. 5 is an isometric view of a Newspaper Rack further detailing the operation of the present invention in the preferred embodiment.

FIG. 5 illustrates a more detailed isometric view of a Newspaper Rack 300 to more clearly define the preferred embodiment of the present invention. The Newspaper Rack 300 includes a housing comprising a top surface 502, side surfaces 504, and front and rear surfaces 506. The housing contains mechanisms required to dispense newspapers, including a sales access door 240 that is moveably coupled to the housing via hinges 510. The sales access door 240 can include an access door handle 508, a transparent viewing panel 518 to display the current newspaper 310. The Newspaper Rack 300 further includes a sales access door 240 release mechanism, comprising a release solenoid 512 that activates a shaft 514, whereby the shaft 514 is placed into and removed from a locking mechanism 516. The locking mechanism 516 may be a loop coupled to the sales access door 240. The solenoid 512 can be activated by a voltage or current applied from a remote payment system (100 of FIG. 4) or a Newspaper Rack logic circuitry (280 of FIG. 4), whereby the Newspaper Rack logic circuitry (280 of FIG. 4) may be controlled by a mechanical or electromechanical coin receiving mechanism 290, a remote automated payment system 100, a Newspaper Rack transceiver 255, and the like. The present invention introduces the novel apparatus of interfacing a remote payment circuit 180 in a remote automated payment system 100 and the Newspaper Rack logic circuitry 280 in the Newspaper Rack 300 by transmitting a signal via wire or wireless technology. Newspaper Racks 300, in particular, further the need for low power consumption. By using a remote automated payment system 100, the Newspaper Rack 300 reduces the power consumption by diverting the power required for supporting the technologically advanced payment means such as credit card readers, RF readers, iris recognition systems, and the like to another apparatus. This shift in power consumption makes the use of batteries as a power source for some items in the Newspaper Rack 300 feasible. The use of a remote payment system further provides a means for methods of payments other than coins, such as credit cards, debit cards, cash tendered to drive through tellers, smart cards, other vending machines and the like. Credit and debit cards require communication facilities that are costly (and nearly impossible to provide) for Newspaper Rack 300. Newspaper Racks 300 are placed in remote locations, not generally convenient for any utilities such as power or wired or landline telephone, thus wireless transmissions would be required. Wireless transmissions are currently provided at a much higher cost than wired transmissions. The average retail price of a Newspaper is approximately $0.50. Credit card service and wireless transmission charges would make the use of these services cost prohibitive. By combining the sale of the Newspaper with sales of other objects, the cost of the total sale is no longer cost prohibitive. Drive through sales can be considered impulse sales as the consumer is exposed to the option during the ordering process. When oneplaces a Newspaper Rack 300 in the drive-through lane and includes the capabilities to purchase the Newspaper by including the request when placing the order with the other desired items purchased at the drive through during the same transaction. The Cashier would provide the signal to the Newspaper Rack 300 to allow the customer (140 of FIG. 3) to acquire a Newspaper 310 by opening the sales access door 240.

Further, an inventory sensor 530 may be included in the newspaper vending machine to sense either a low inventory or depleted inventory of newspapers 310. The inventory sensor 530 can interface with a Newspaper Rack transceiver 255, whereby the sensor 530 can transmit a signal independently or in conjunction with a logic circuit (not shown) to a Newspaper Rack transceiver 255 when the inventory reaches a predetermined count. The process will be described in detail within the specification.

A service person would normally require a key or other depository access device 520 to access the coin depository (not shown). This can be used to cause the system to transmit a signal to inform the Single Copy Manager that the Newspaper Rack 300 has been serviced, such as when the Newspaper Rack 300 was replenished with Newspapers 310.

Figure 6:
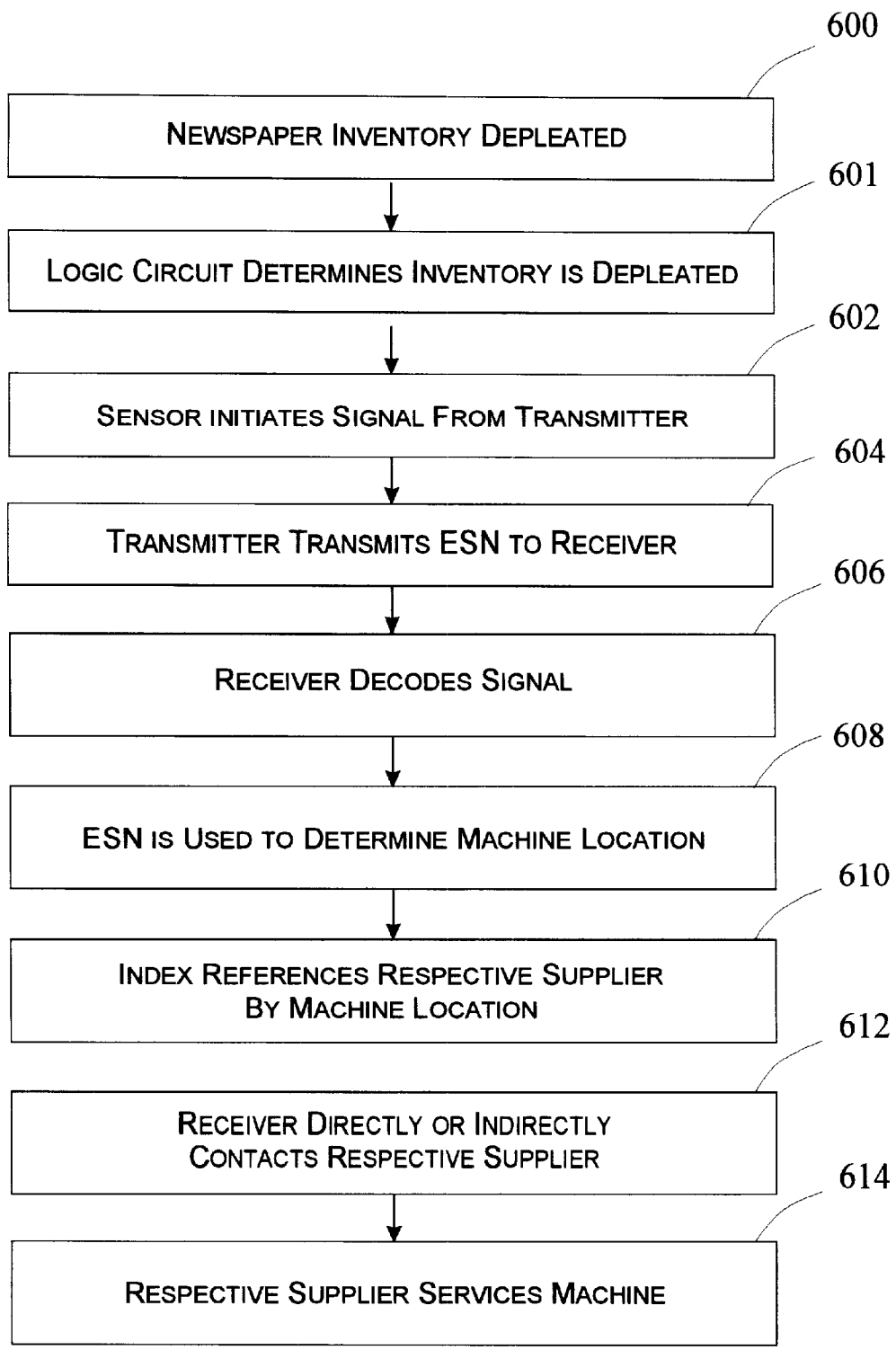
FIG. 6 is a flow chart diagram of a means to communicate to a remote service request from a Newspaper Rack to a Service Person.

FIG. 6 is a flow chart diagram that illustrates one method in which a transmitter can notify a party that a particular Newspaper Rack 300 requires servicing. As the newspapers are sold, the inventory is reduced to a predetermined quantity or completely depleted, as in first step 600. The reduction of inventory would meet or surpass a predetermined quantity whereby once the inventory surpasses the predetermined quantity, a sensor 530 (and combined logic circuit) would communicate with a Newspaper Rack transceiver 255 to initiate a signal as a second step 602. The sensors can be placed within the door of the Newspaper Rack 300, coupled to the platform of the Newspaper Rack 300, coupled to the vertical platform control columns of the Newspaper Rack 300, and the like. The applied sensor(s) would be preferably normally in one state such as normally open when the inventory is filled, and change to an opposing state or closed, when the inventory reaches the predetermined quantity such as depleted. These will be further illustrated in later figures. A logic circuit would regularly scan the various sensors to determine when a sensor has changed status. One such example is a logic circuit that would scan approximately every 5 seconds. When the logic circuit determines that a sensor have changed state, the Newspaper Rack transceiver 255 would then transmit a signal to a receiver as a third step 604. The signal can include an electronic serial number or the like to provide a means for the receiver to identify the Newspaper Rack transceiver 255. The receiver would receive the signal with the encoded information and decode it as a fourth step 606. The receiving and decoding device would use the decoded information to determine the location of the Newspaper Rack 300 that requires servicing. The receiving and decoding device can further include a means to determine the time and a means to record any desired information such as specific Newspaper Rack 300 and time in which the signal is received. The specific Newspaper Rack 300 and ???? location can be determined by comparing the electronic serial number (ESN) or other encoded information to a known database which cross-references the encoded information with a known location as a fifth step 608. The receiver and decoding device would, in turn, use the location information to determine which respective supplier should be notified to service the Newspaper Rack 300 and how to contact the respective supplier as a sixth step 610. The receiver and decoding device can then communicate with the respective supplier using a selective call receiver, email, or in some other manner, to notify the respective supplier that the specific Newspaper Rack 300 requires servicing as a seventh step 612. The respective supplier would then service the Newspaper Rack 300 as an eighth step 614. When the Service Person services the Newspaper Rack 300, the service person would cause a signal to be transmitted stating the Newspaper Rack 300 has been serviced. Several examples would be where the service person would use the key or other depository access device (520 of FIG. 5) to open the sales access door 240, triggering a switch on the inside of the Newspaper Rack 300, or any other means of providing a signal to the Newspaper Rack logic circuit 280 to identify that the service person has provided service to the Newspaper Rack 300. The information may further be recorded at the receiver and decoding device, forwarded to the respective Single Copy Sales Manager, or the like, to provide a means to track the activities of each particular Newspaper Rack 300.

A preferred embodiment would be to receive the signal, decode the data transmission to determine the ESM and any encoded message, and transfer the information to a server on the internet. Once the information is transferred to the server, the server would complete a reference look-up using the ESM to determine the physical location of the Newspaper Rack 300. The server would determine the time the information was received. The server would complete a reference look-up using the encoded message to determine the status of the Newspaper Rack 300 that is to be conveyed to the Single Copy Sales Manager, Service Person, or other. The information would be compiled into a database for demographic information or any other useable information. The compiled information can be provided to the respective party such that the respective party may utilize the information to optimize the inventory management for each individual vending machine 300. One such means would be via an internet web site.

Figure 7:
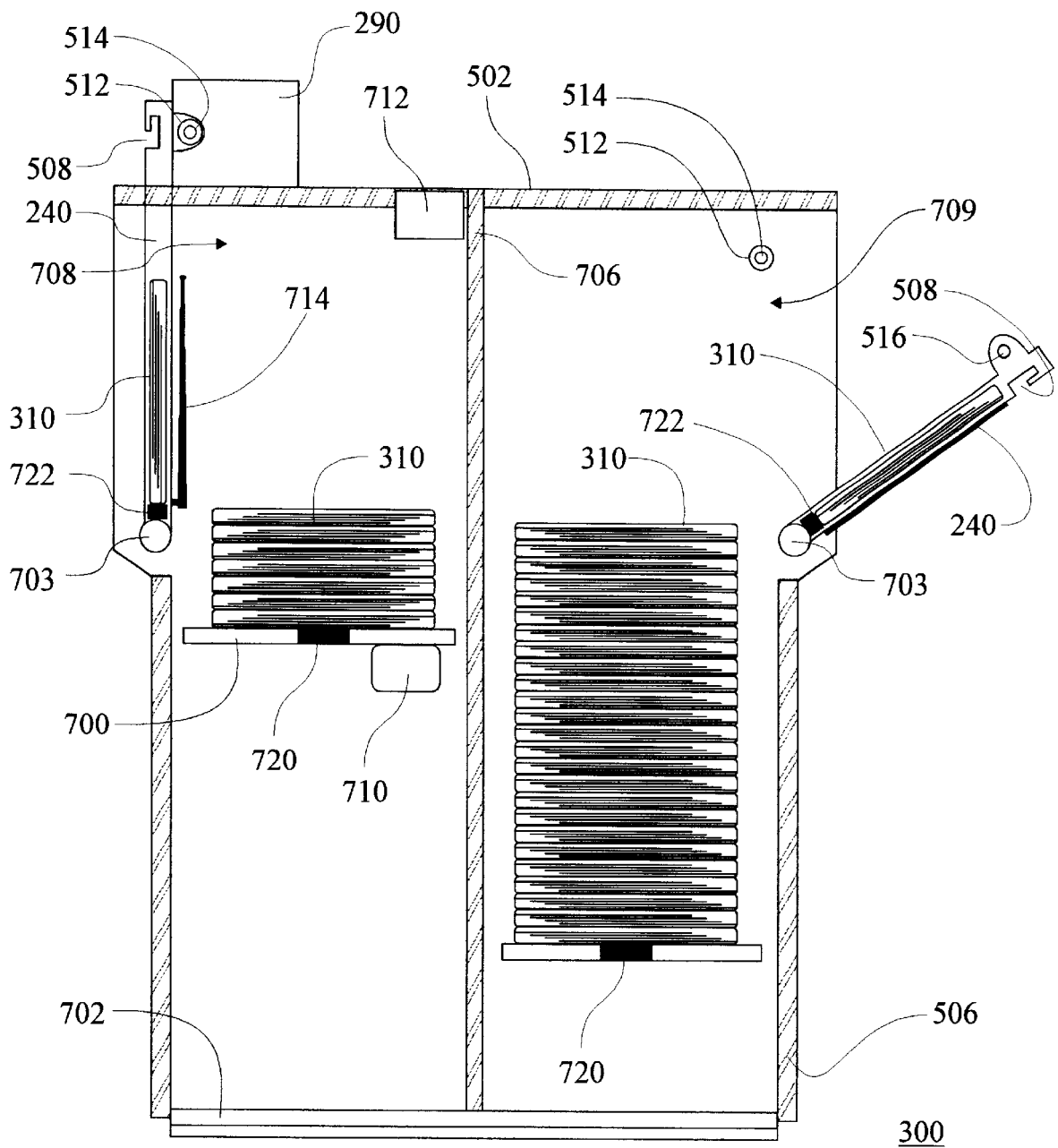
FIG. 7 is a cross sectional diagram illustrating optional placement of components of the present invention.

FIG. 7 is a cross sectional view of a modular Newspaper Rack 300. A modular Newspaper Rack 300 is a Newspaper Rack 300 that contains multiple Newspaper 310 dispensing subsections or multiple Newspaper Racks 300 coupled to each other. The cross sectional view illustrates a Newspaper Rack 300 housing comprising a top surface 502, side surfaces 504, a front and rear surface 506 and a bottom surface 702. A sales access door 240 would be coupled to the Newspaper Rack 300 housing via sales access door hinges 703. It is preferred that the sales access door hinges 703 include springs or other means to automatically return the sales access door 240 to a closed position (as shown on the left).

The Newspaper Rack 300 includes a mechanical or electromechanical coin receiving mechanism 290. The coin receiving mechanism 290 is used to register the payment made by the customer to purchase a Newspaper 310.

The service person would deposit a number of Newspapers 310 onto a storage platform 700 as well as one Newspaper 310 into the sales access door 240. The sales platform 700 is suspended along multiple vertical platform control columns (not shown) by springs (not shown). The storage platform 700 would lower as a result of the weight of the Newspapers 310 against the force of the springs. The deposited Newspapers 310 will change the state of a platform inventory sensor 720 and a sales access door inventory sensor 722. A sensor can be positioned relationally to the platform 700 to identify when the platform passes a predetermined position, reflecting an estimated number of remaining Newspapers 310.

The sales access door 240 is maintained in a closed position by a sales release mechanism illustrated herein as a solenoid 512 and shaft 514, whereby the shaft 514 located to a loop 516 coupled to the sales access door 240. It is recognized that the solenoid 512 is only one means of many that can accomplish the same utility and the invention herein should not be limited in scope by the means for maintaining closure and allowing access to the deposited inventory of Newspapers 310. Upon recognition of payment for the newspaper 310, the Newspaper Rack 300 would disengage the sales release mechanism allowing the user to pull the sales access door handle 508, open the sales access door 240, and remove a Newspaper 310. When the last Newspaper 310 is removed from the Newspaper Rack 300, the platform inventory sensor 720 and/or the sales access door inventory sensor 722 would change states. A sensor may be positioned in a manner to determine when a specific number of Newspapers 310 remain by positioning the sensor respective to the position of the storage platform 700. It can be recognized that other sensor locations may be used within the scope of the present invention. The user would have the option of where to place the sensor.

The Newspaper Rack 300 would include a battery housing 710. The preferred embodiment would be to locate the battery housing 710 proximate the bottom side of the storage platform 700. The current configuration of the storage platform 700 includes a cutout located approximately at the center of the storage platform 700. The cutout can be used to access the battery housing 710.

The Newspaper Rack 300 would include a monitoring transmitter 712 and a respective transmitting antenna 714. The preferred embodiment would position the monitoring transmitter 712 along the top surface 502, towards the rear of the Newspaper Rack 300 and the transmitting antenna 714 proximate the transparent viewing panel 518.

Module Newspaper Racks 300 would include a separation panel 706 between two Newspaper Racks 300.

Figure 8:
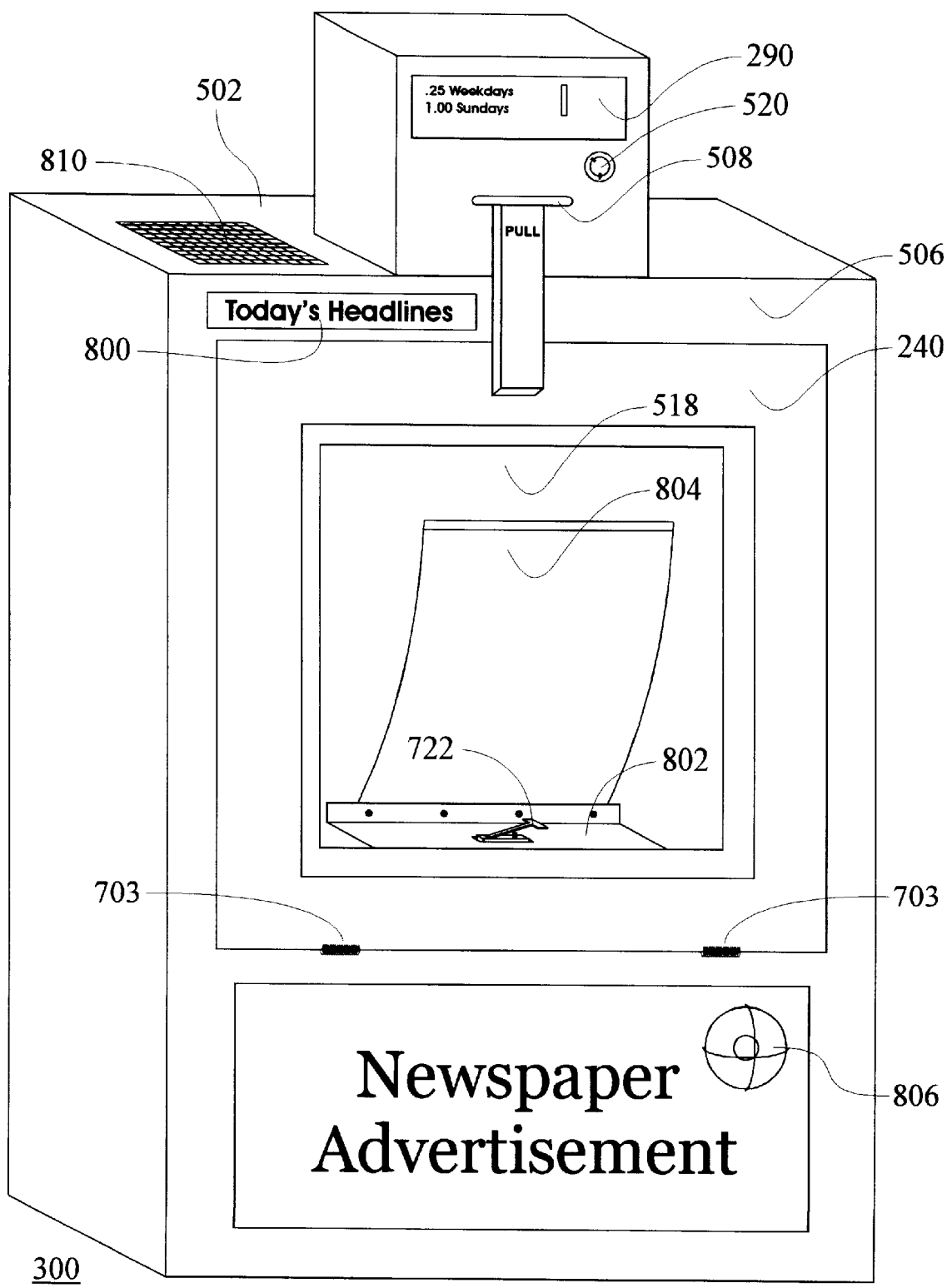
FIG. 8 is an isometric view illustrating features of the present invention.

FIG. 8 illustrates an isometric frontal view of a Newspaper Rack 300 further demonstrating several features of the present invention. The illustration presents additional features of the sales access door 240, including the Newspaper support member 802 and retention member 804. A Newspaper 310 would be placed in the sales access door 240 in a manner that displays the Newspaper 310 through the transparent viewing panel 518. The Newspaper 310 positioned within the sales access door 240 is normally the last newspaper 310 sold. The newspaper 310 would be positioned within the sales access door 240 in a manner to change the state of the sales access door inventory sensor 722. The sales access door inventory sensor 722 shown is a micro-switch that can be wired in either normally closed or normally open positions. The micro-switch would be coupled to the Newspaper support member 802 using an angled bracket and positioned where the activation finger protrudes through a cutout within the Newspaper support member 802.

The illustration includes a solar panel 810, a visual display 800 for visually attracting customers, and an audio emitting device 806 for audibly attracting customers. The solar panel 810 would be used for power. The power would be to supplement power to the Newspaper Rack 300 or recharging a battery. The visual display 800 could be an LED module, LCD module or other means to provide changeable displays. The audio emitting device 806 could be a speaker or any similar device to transmit audible signals to attract the attention of customers. Each of these devices visual display 800 and the audio emitting device 806 can be activated by a proximity sensor, whereby when a potential customer passes the Newspaper Rack 300, the proximity sensor would trigger a circuit and the display would become active. The display may become inactive after a predetermined period of time. The present invention includes a receiver that would allow the Newspaper company to change the messages presented using the visual display 800 and/or the audio emitting device 806. The transmitted messages would be changeably stored within an electronic module.

The service person uses a depository access device 520 when changing the inventory within the Newspaper Rack 300 or removing any change deposited within the coin receiving mechanism 290. In the preferred invention, the depository access device 520 would cause the system to activate the transmitter (712 of FIG. 7) and transmit a signal stating that the Newspaper Rack 300 has been serviced. Since the preferred embodiment of the present invention includes scanning the various sensors instead of constantly monitoring the various sensors, there may be a scenario whereby the Newspaper Rack may be serviced and the logic circuit may not identify that the state of the sensor(s) has been reset. This process guarantees that the system identifies the time the Newspaper Rack 300 is serviced and initiates a request for transmission of a representative signal. Alternatively, the system can use other sensors or switches such as a magnetic switch where the service person would place a magnetic controller proximate the magnetic switch to cause a change in state of the magnetic switch to institute the same desired service complete signal.

Newspaper Racks 300 are located across a large, varied area. This distribution of Newspaper Racks provides a vast ability to collect data. Within the present invention, it can be recognized that sensors to obtain data on external interest can be positioned proximate the Newspaper Rack 300. External sensors can include proximity sensors to monitor passing traffic, humidity sensors, temperature sensors, rain gauges, noise sensors, and any other items that can be desirable to be monitored. The data collected can be remotely transmitted using the same systems used for monitoring inventory levels. This provides a distributed network of platforms for collecting data as well as a means for offsetting the monitoring costs that would normally be incurred by the Newspaper company.

Figure 9:
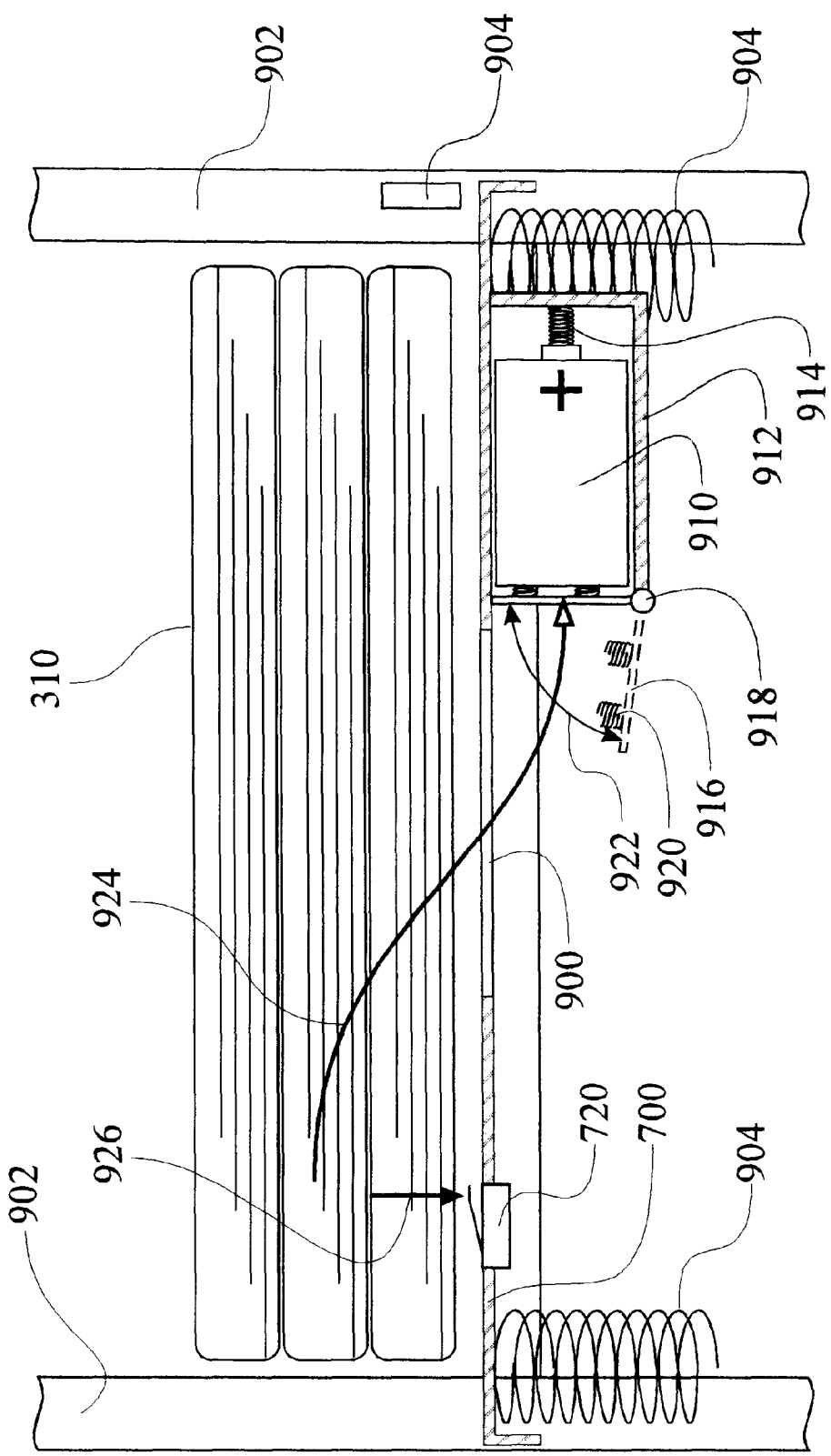
FIG. 9 is a cross sectional view of a platform illustrating details of the present invention.

FIG. 9 illustrates a cross sectional view of the storage platform 700 and a portion of the components of the present invention not previously illustrated herein. The storage platform 700 includes a battery access cutout 900 for accessing the battery 910 located within the battery housing 912. The battery housing 912 comprises a housing, a battery-housing door 916 coupled to the battery housing via a battery door hinge 918, and a contact 912 for each terminal of the battery 910. The battery-housing door 916 would preferably comprise a compliant member 920 such as springs to maintain a pressure contact between the battery terminals and the contacts 914. The battery 910 would be installed and removed through the battery access cutout 900 within the storage platform 700 such as by following a battery changing path 924. A service person would open the battery housing door 916, remove the drawn battery 910, install a fresh battery 910, and close the battery housing door 916. When closed, the battery-housing door 916 would apply pressure to maintain an electrical connection between the battery 910 and the contacts 914. The figure further illustrates the storage platform inventory sensor 720 and the inventory indicating force 926. When at least one Newspaper 310 is placed onto the storage platform 700, the Newspaper 310 applies the inventory indicating force 926.

The figure illustrates the vertical platform control columns 902 used to control the horizontal position of the storage platform 700. Vertically controlling compliant members 904 such as springs are used to adjust the vertical position of the storage platform 700 when a load is applied such as filling the Newspaper Rack 300 with Newspapers 310. A platform inventory sensor 904 can be coupled to any of the multiple vertical platform control columns 902 in a manner whereby when the storage platform 700 is raised to a predetermined position, the sensor changes state (as newspapers are removed the platform is raised by the vertically controlling compliant members 904). Alternatively, the platform inventory sensor 904 can be coupled to the Newspaper Rack 300 side surfaces 504 or front or rear surfaces 506. This provides alternate embodiments for monitoring the inventory of the Newspapers.

It should be recognized that there are many options regarding how and where to place the various interfaces and the variations should not limit the spirit or intent of the present invention.

What is claimed:

1. A method for the monitoring the inventory of a Newspaper Rack comprising the steps:

placing at least one Newspaper onto a platform and at least one Newspaper positioned within a door;

monitoring the inventory of the Newspapers using at least one inventory sensor which changes state when at least one of the last newspaper positioned on the platform is removed, the newspaper positioned within the door is removed, and a moveable platform is positioned to a predetermined position;

identifying a change in state of the sensor, providing a wireless transmission to notify a party that said Newspaper Rack requires servicing.

2. The method of claim 1, the method further comprising the step:

the service person triggering an indicating device which causes the system to transmit a service complete signal.

3. The method of claim 1, the method further comprising the step:

using the internet to manage the decoded wireless transmissions, and wherein the step of determining the time representative of the transmission is accomplished using at least one of the internet and the time registered by the decoding system.

4. The method of claim 1, the method further comprising the steps:

allowing the customer to automatically pay for the Newspaper.

5. The method of claim 4, wherein the step of allowing the customer to automatically pay for the Newspaper, utilizes at least one of:

A) a mechanical coin mechanism,
   B) an electromechanical coin mechanism,
   C) a cash reader,
   D) a debt card reader,
   E) a credit card reader,
   F) a smart card system,
   G) an RF recognition system,
   H) an iris recognition system,
   I) a fingerprint recognition system,
   J) payment made at an ATM machine, and
   K) payment made at a fuel dispensing apparatus.

6. The method of claim 1, the method further comprising the steps:

receiving the wireless transmission, and decoding the wireless transmission to determine the location of the Newspaper Rack.

7. The method of claim 6, the method further comprising the step:

using the internet to manage the decoded wireless transmissions.

8. The method of claim 6, the method further comprising the step:

determining a time representative to the transmission.

9. A Newspaper Rack comprising:

a wireless receiver;

a decoding circuit to decode a wireless transmission;

an electronic storage apparatus for storing a sales stimulating message; and at least one of an electronically changeable, visual alerting display and an audible alerting device.

10. The Newspaper Rack of claim 9, the Newspaper Rack further comprising:

a sensor to identify when the inventory of Newspapers within a Newspaper Rack are equal to or below a predetermined quantity.

11. The Newspaper Rack of claim 9, the Newspaper Rack further comprising:

a solar power source.

12. A Newspaper Rack comprising:

a moveable platform for positioning a plurality of Newspapers;

a sales access door;

at least one of an inventory sensor to monitor when at least one Newspaper is positioned on the moveable platform, an inventory sensor to monitor when the moveable platform equals or passes a predetermined position and an inventory sensor to monitor when a Newspaper is positioned within the sales access door;

a circuit for monitoring at least one of the at least one of inventory sensors of the Newspaper Rack; and a wireless transmitter.

13. The Newspaper Rack of claim 12, the Newspaper Rack further comprising:

a solar power source.

14. The Newspaper Rack of claim 12, the Newspaper Rack further comprising:

a battery.

15. The Newspaper Rack of claim 12, the Newspaper Rack further comprising:

a transparent viewing panel located with the sales access door, and an antenna, whereby the antenna is coupled to the Newspaper Rack at least one of externally and adjacent a transparent viewing panel.

16. The Newspaper Rack of claim 12, the Newspaper Rack further comprising:

a service indicator, whereby the service indicator is to be operated by a service person to indicate that the Newspaper Rack has received service, and the service indicator is integrated into the system whereby when the service indicator is operated, the system transmits a service indicating signal.

17. The Newspaper Rack of claim 12, the Newspaper Rack further comprising:

an external activity monitoring apparatus.

18. The Newspaper Rack of claim 12, the Newspaper Rack further comprising:

an automated payment system.

19. The Newspaper Rack of claim 18, the Newspaper Rack further comprising at least one of:

L) a mechanical coin mechanism,
M) an electromechanical coin mechanism,
N) a cash reader,
O) a debt card reader,
P) a credit card reader,
Q) a smart card system,
R) an RF recognition system,
S) an iris recognition system, and
T) a fingerprint recognition system.

20. The Newspaper Rack of claim 14, the Newspaper Rack further comprising:

a battery monitoring circuit.

21. The Newspaper Rack of claim 20, the Newspaper Rack wherein the battery is coupled to the underside of the moveable platform.

* * * * *